2,879,635
METHOD OF PACKAGING ARTICLES

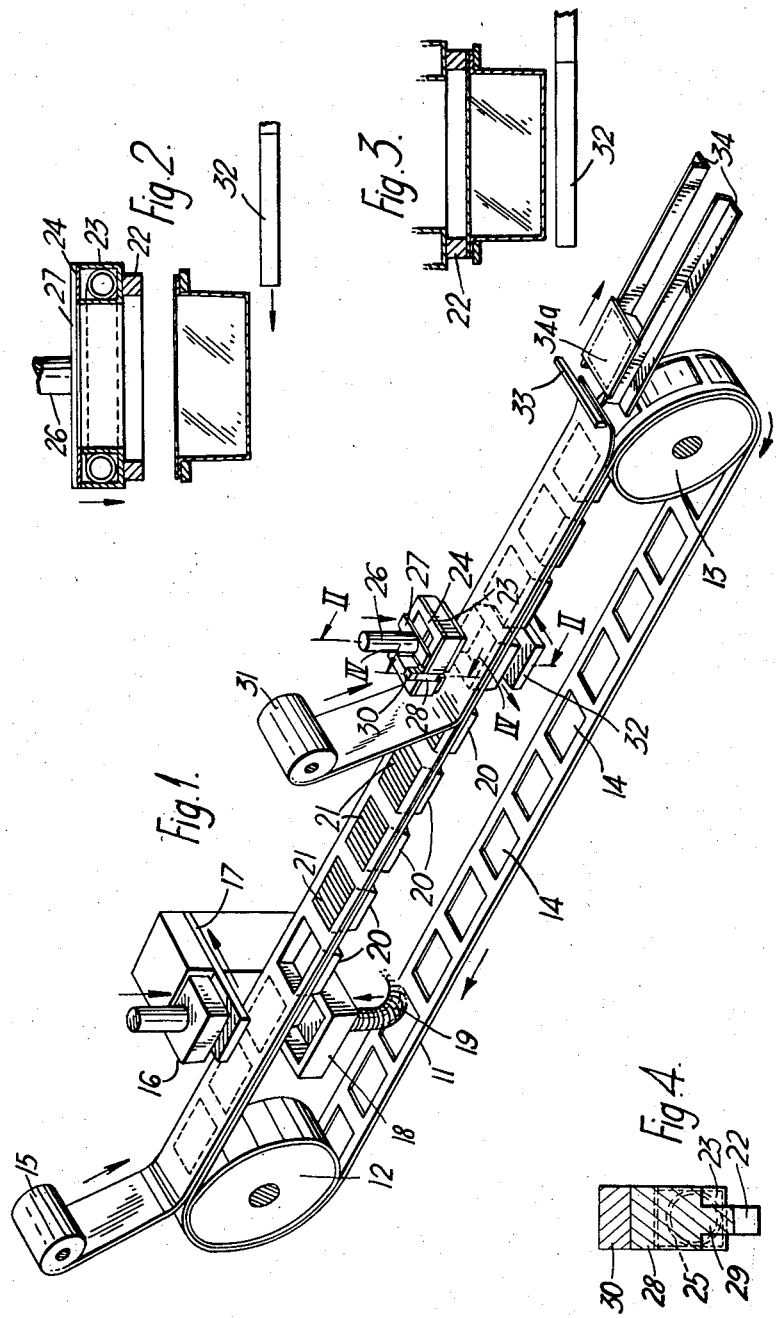

Herbert William Brock, Abbotsford, near Melbourne, Victoria, Australia

Application September 27, 1957, Serial No. 686,754

Claims priority, application Australia October 2, 1956

3 Claims. (Cl. 53—28)

The present invention relates to an improved method of packing articles especially biscuits and other foodstuffs and has as an object the provision of a method by which articles can be packaged simply and economically in substantially moisture-proof packages in which they are held firmly in position.

In accordance with the present invention there is provided a method of packaging articles which comprises placing the articles in open receptacles formed of thermoplastic material in the heat-contractable state, closing the receptacles and subjecting them to heat thereby contracting them on to the contained articles.

Thermo-plastic materials may be obtained in the heat-contractable state by stretching them at temperatures such that they are softened and then cooling them until they are capable of retaining their stretched condition. The stretched condition is however an unstable one and if they are subsequently softened by heating they tend, unless restrained, to return to their original dimensions and configuration. Examples of thermo-plastic materials which behave in this manner and are therefore suitable for forming the said receptacles are polystyrene, polyvinyl chloride, polyethylene, polyvinylidene chloride, and copolymers of vinyl chloride with vinylidene chloride. Owing to its non-toxic properties a composition formed from polyvinyl chloride and an ester of cyclohexanol or a nuclear substituted cyclohexanol as described in my Australian applications 16,412/56, 16,677/56, 18,381/56 and 19,165/56, is the preferred thermo-plastic material for use in the practice of the present invention as applied to the packaging of foodstuffs.

Whilst it is possible in accordance with the invention to fabricate the receptacles from heat-contractable thermoplastic material produced in the form of flat sheets using folding techniques analogous to those employed in the manufacture of cartons or bags from paper or cardboard, it is preferred in practice to produce each receptacle by heating the thermoplastic material in the form of a sheet until it is softened, bulging the softened material to the shape of the receptacle and cooling it sufficiently to enable it to retain said shape. The bulging, which necessarily involves stretching of the sheet, may be carried out in any convenient manner, for example by pressing with a former, by blow-moulding or vacuum-moulding. For ease of handling the receptacles are advantageously produced from a continuous strip of the thermoplastic in the form of a series extending along the length of said strip.

For closing the receptacles prior to contracting them, there may be employed any procedure which is convenient having regard to the form in which they are provided. Thus receptacles in the form of bags may be closed by heat sealing across their open mouths, and receptacles in the form of cartons provided with integral flaps adapted to close them when required may be closed by heat sealing the flaps in the closed position. Adhesive, rather than heat sealing techniques may be employed where preferred.

A preferred method of closing the receptacles, especially receptacles produced by bulging as aforesaid, is to heat to seal or otherwise seam sheet material thereto, this method being especially convenient if each receptacle has a mouth which is surrounded by an outwardly directed flange and is closed by placing thermo-plastic sheet material over said mouth and heat sealing it to said flange. The thermoplastic sheet material placed over said mouth may itself be employed in the form of a receptacle which co-operates with said receptacle to give a final package of increased size; it is normally most convenient to employ it in planar form. Where the receptacles are provided in the form of a series extending along the length of a strip of the thermoplastic material, sheet material employed for closing the receptacles is advantageously employed in the form of a continuous strip.

Whatever method is employed for the closing of the receptacles, it is desirable that each receptacle should have a ventway leading between its interior and its exterior whilst being contracted, said ventway allowing the contraction to take place without increasing the internal pressure. A ventway in the form of a pinhole has been found to give good results but is preferably avoided where the final package is required to be completely sealed. Best results are obtained where each receptacle has a flange to which thermo-plastic sheet material is sealed as previously indicated and the thermo-plastic sheet material is held by applied pressure in contact with the flange around the major part of the mouth of the receptacle whilst leaving, as a ventway, a zone at which the flange and the sheet material are free from applied pressure and pressure is applied over said zone after the receptacle has been contracted.

The present invention provides a long awaited solution of problems in the packaging art. Such problems are encountered in an extreme form in the packaging of biscuits but are also encountered with other products. Biscuits are fragile articles which are very sensitive to atmospheric exposure. They have a great affinity for atmospheric moisture and rapidly loose their desirable characteristic of crispness when exposed. Furthermore the contained fat is very easily rendered rancid by atmospheric oxygen. Even when distributed in multilayer conventional wrappings, they have such a short shelf-life that, even in temperature climates, considerable care has to be taken to ensure that they reach the consumer with great rapidity. In addition the mechanical protection given by the conventional wrappings is poor, and as high a proportion as 10% of a manufacturer's output is rendered unsaleable by breakage alone. These difficulties could only be avoided prior to the present invention by the employment of metal cans in place of wrappings but, except with the most expensive biscuits, only at a prohibitive cost.

It is found in contrast, that biscuits packaged in accordance with the present invention are gripped so firmly on the contraction of the receptacle that breakage is nearly impossible during normal handling. In fact it is often possible for a man to stand upon a package without damaging the contents. The thermo-plastic material is virtually impermeable to oxygen or moisture and is capable of maintaining the biscuits in fully saleable condition for at least a month even in such extreme climates as those of Mombassa or New Guinea or even in heated humid chambers of the type employed in testing the suitability of military equipment for use in tropical campaigns.

As the receptacle mates closely with the biscuits, only a negligible amount of gas remains if the receptacle is vented during contraction as is preferred. Steps may be taken if desired to ensure that the residual gas is a wholly inert gas such as nitrogen but are usually unnecessary.

The following description in which reference is made to the accompanying drawing is given in order to illustrate the invention.

In the drawing:

Figure 1 shows the operative parts of a packaging machine in perspective at one stage of its operative cycle;

Figure 2 is a cross-section of part of Figure 1 taken in the direction of the arrows 2;

Figure 3 is similar to Figure 2 but shows parts of the machine at a different stage of the operative cycle, and Figure 4 is a local cross-section taken in the direction of the arrow 4.

In the machine there is provided a carrier band 11 formed of metal strip mounted for travel around an idler drum 12 and a drum 13 which is driven by an intermittent mechanism (not shown). Along its length the band is formed with regularly spaced rectangular apertures 14 spaced as shown and the intermittent mechanism is so arranged that each time the belt is moved, its distance of travel is equal to the distance between the centres of adjacent apertures.

Thermo-plastic sheet material of width approximating to the width of the band 11 is drawn, by the movement of the band from a roll 15. Each aperture 14 brought in turn under, and held stationary under a heated former 16, which is provided with a coating of polytetrafluoroethylene and which is mounted for vertical reciprocation. The portion of the band beneath the former 16 is heated by a horizontally reciprocable radiant heater 17 until soft and, incidentally, sterilised. Under the upper reach of and vertically below the former 16 is vertically reciprocably mounted a mould 18 having a cavity which corresponds in shape with the former 16, which is substantially larger than said former and which at its opening is identical in size and shape with the apertures 14. This mould so moved upwardly into contact with the band whilst the material over it is being softened by the heater 17. When the material has been softened the heater 17 is withdrawn and the former 16 presses the material into the mould 18. Suction applied via a vacuum line 19 sucks the material out of contact with the former 16 and into contact with the mould 18 where it is immediately chilled to a dimensionally stable state. The mould, the former and the heater 17 are then returned to the positions in which they are shown in Fig. 1. The result of these operations is to provide a series of open box-like receptacles 20, held by the apertures 14.

The receptacles 20 are filled manually or otherwise with biscuits or other articles 21 and are brought in turn under a heat-sealing device in the form of a rectangular annulus 22 mounted on the underside of an annular box 23 formed of U-section extruded aluminium and an annular cover 24. The box is provided internally with a thermostatically controlled heater such as the tubular electric heater 25. On one side the box, which is vertically reciprocally mounted upon a rod 26 secured to a cross-piece 27, and the annulus 22 are formed with a gap having a metal plunger 28 slidably keyed therein. On its underside the plunger is formed with a projection 29 which corresponds in cross-section with the annulus 22 and on its upper side it is provided with an extension 30 of heat insulation material by which it is connected with reciprocating means (not shown) in such a manner that it retains heat absorbed from the box 23.

As they pass each receptacle under the heat-sealing device the receptacles are covered with a strip of thermoplastic material from a roll 31. On descent of the sealing device each receptacle has its marginal portion pressed between the band 11 and the heated annulus 22. No pressure however is as yet exerted by the projection 29, the plunger being at this stage in the raised position.

Below the heat sealing device is mounted a horizontally reciprocable radiant heater 32 which now moves into position below the receptacle. Alternatively there may be employed a series of jets for directing hot air over the receptacle. As heat-sealing is taking place around the marginal portion of the receptacle, the heat applied by heater 32 causes the thermo-plastic material forming the container to shrink and thus grip the articles 21 tightly. Simultaneously air leaks from the container by passing under the projection 29. When shrinkage is complete the heater 32 is withdrawn and the plunger 28 is lowered thus rendering the heat sealing complete all around the margin of the receptacle and rendering it completely air-tight. The heat sealing device is raised and the belt moves to bring another receptacle thereunder.

As the machine continues to operate the sealed receptacles move onwardly in the form of a continuous band. The receptacles are raised as they pass over the driven roller 13 and separated by a cutter 33. They drop on to rails 34 down which they slide as separate articles such as 34a suitable for packing in crates, which may be of a cheap open-work pattern for distribution.

For giving the operative parts of the machine the motions just described there may be provided any convenient arrangement. A preferred arrangement is a pneumatic arrangement with separate rams for moving the different reciprocating parts, said rams being controlled by valves actuated by cams on a common shaft linked with the driving mechanism for the drum 13.

I claim:

1. A method of packaging articles comprising the steps of placing the articles in open receptacles of thermally shrinkable, stretched, heat-sealable material, covering the receptacles with heat-sealable material, sealing the covering material to the receptacles while heating the latter to cause the receptacles to shrink around the respective articles therein and while venting the interior of the receptacles so as to avoid the build-up of pressure in the latter, and sealing the venting from the interior of the receptacles.

2. A method as in claim 1; wherein each receptacle has a mouth with an outwardly directed flange extending there around and the heat-sealable material with which each receptacle is covered is in the form of sheet material; and wherein the covering material is sealed to the receptacles by applying heat and pressure urging together said flange of each receptacle and the covering sheet material, said pressure being excluded from a minor portion of said flange so that said venting occurs between said minor portion of the flange and the overlying covering sheet material.

3. A method as in claim 2; wherein each of said receptacles is produced by heating said thermally shrinkable material in the form of a sheet until the latter is softened, bulging the softened material to the desired shape of the receptacle and cooling the material sufficiently to enable it to retain said desired shape.

References Cited in the file of this patent

UNITED STATES PATENTS

| | | |
|---|---|---|
| 2,340,260 | Clunan | Jan. 25, 1944 |
| 2,530,306 | Land | Nov. 14, 1950 |
| 2,546,059 | Cloud | Mar. 20, 1951 |
| 2,549,122 | Osterhof | Apr. 17, 1951 |
| 2,549,123 | Osterhof | Apr. 17, 1951 |
| 2,597,041 | Stokes | May 20, 1951 |
| 2,736,150 | Loew | Feb. 28, 1956 |

FOREIGN PATENTS

| | | |
|---|---|---|
| 461,794 | Germany | June 29, 1928 |